April 1, 1930.  W. F. HEROLD  1,752,982
METHOD OF PRODUCING SPRING RINGS
Original Filed July 6, 1926
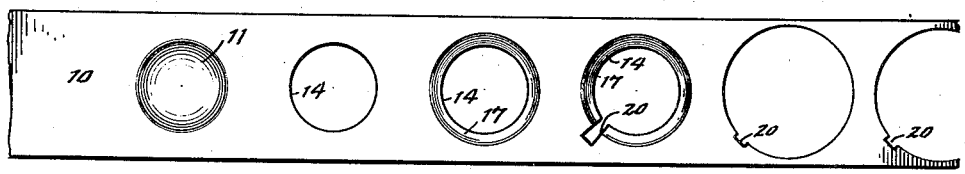
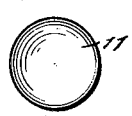  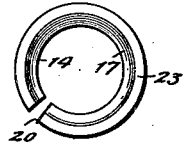
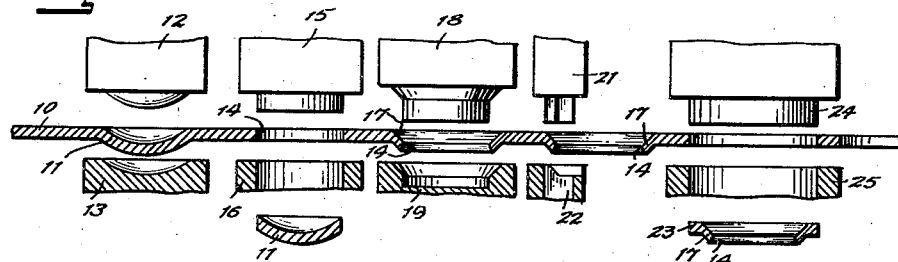
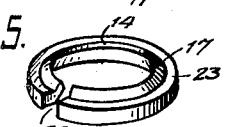  
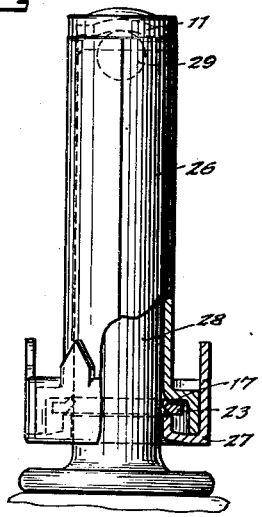  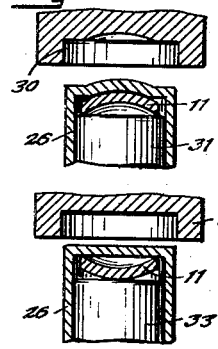  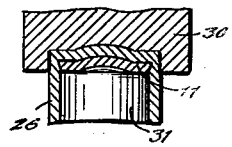
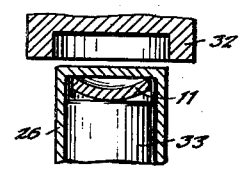
INVENTOR.
WALTER F. HEROLD.
BY
ATTORNEY.

Patented Apr. 1, 1930

1,752,982

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT

METHOD OF PRODUCING SPRING RINGS

Original application filed July 6, 1926, Serial No. 120,672. Divided and this application filed December 27, 1926. Serial No. 157,258.

The present invention relates to an improved method of producing sheet metal spring rings, the present application being a divisional application of my former application filed on the 6th day of July, 1926, Serial No. 120,672, now Patent #1,696,912 dated Jan. 1, 1929.

Spring rings have heretofore been produced by bending wire, or other stock, into ring shape, which was unsatisfactory not only from the standpoint of production and expense, but from the fact that it was practically impossible to maintain exact sizes and tensions, and in the production of small diameters the rings would not conform to a true circle, due to their tendency to straighten out at the ends. This was particularly true in the production of rings having a non-circular cross-section, the bending operation in this case also tending to change the cross-sectional shape, so that it was not uniform at all points.

It is proposed in the present invention to provide a spring ring from flat sheet metal stock, to the end that it may be economically produced by means of shaping and blanking dies, and in which exact shapes and sizes may be accurately maintained and the desired tension positively determined, and maintained in production.

A further object is to produce, as a part of the process of making the spring ring, a concavo-convex, or other suitably shaped, disc or plate, the spring and plate thus produced, adapted for example, for use in a caster socket construction as disclosed in my co-pending application Serial Number 120,671, filed July 6. 1926, now Patent #1,649,527 dated Nov. 15, 1927, although the spring, as well as the plate, are adapted for numerous other uses.

Another object is to produce a ring of non-circular and uniform cross-section, and particularly one having a beveled lead surface for guiding the insertion of a pintle, or the like. It is also proposed to provide a ring of relatively thin metal thickness, so that it will occupy a relatively narrow space, and which ring will at the same time be relatively strong.

With the above and other objects in view, an embodiment of the invention is shown in the accompanying drawings, and this embodiment will be hereinafter more fully described with reference thereto, and the invention will be finally pointed out in the claims.

In the drawings:—

Fig. 1 is a plan view of a sheet metal blank strip, showing the several steps of producing the concavo-convex plate and split spring ring, according to the present embodiment of the invention;

Fig. 2 is a plan view of the plate;

Fig. 3 is a plan view of the spring ring;

Fig. 4 is a longitudinal sectional view through the blank, and the plate and spring ring produced therefrom, and showing the relation of the forming and blanking dies thereto;

Fig. 5 is a perspective view of the split spring ring;

Fig. 6 is a perspective view of the concavo-convex plate;

Fig. 7 is a side elevation, partly in section, of a caster socket provided with a spring ring and plate produced according to the invention;

Fig. 8 is a sectional view, showing the plate inserted in the socket, and the securing dies in position to secure the plate;

Fig. 9 is a similar view showing the plate secured; and

Figs. 10 and 11 are views similar to Figs. 8 and 9, of another form of socket top bearing.

Similar reference characters indicate corresponding parts throughout the several figures of the drawings.

Referring to the drawings, the split spring ring and concavo-convex plate, according to the present embodiment of the invention, are adapted to be produced from a flat sheet metal blank strip 10, of brass, spring steel, phosphor bronze, or other suitable metal, by being fed in step by step relation through an automatic forming and blanking press, where the several operations of forming and blanking the metal are performed. The steps of the process may, however, be performed by any desired mechanical means.

The blank is first bumped up, as at 11, by forming dies 12 and 13, to provide a concavo-convex circular shape, the bumped up portion being next blanked out, as at 14, by blanking dies 15 and 16, the plate thus produced dropping into a suitable receptacle. The edge of the hole 14 is next flanged by swaging, as at 17, by forming dies 18 and 19, the flange being beveled and extending from a point inwardly spaced from the outer periphery of the finished ring. The step of swaging the flange 17 so compresses the metal that it is rendered relatively thinner, as clearly shown in Figs. 4 and 5, and is hardened, and in the case of relatively soft brass has the effect of the extra rolling operations to which annealed brass is usually subjected to render it hard and springy. The next step consists in producing a cut 20 at one point in the ring blank, the cut extending from the hole 14 to a point in the strip outside the outer periphery of the ring forming portion, suitable piercing dies 21 and 22 being employed for this purpose. The cut may be radial, as shown, or it may be diagonally or otherwise disposed. The completed split spring ring 23 is finally blanked out by blanking dies 24 and 25, and drops into a suitable receptacle.

The ring thus produced is a true circle, and will lie within a true flat plane, and these characteristics will obtain with even the smallest diameters. The beveled flange, rendered springy by the swaging and hardening action of the forming dies, imparts tension to the ring, the degree of tension being determined by the extent of the flange, that is, increase in the depth of the flange proportionately increases the tension.

In Fig. 7 I have illustrated, as an example, an application of the split spring ring and concavo-convex plate in a caster socket 26, this particular type of socket being disclosed and claimed in my Patent #1,649,527, above referred to. The ring is loosely disposed in an annular pocket 27 provided in the base of the socket, and is adapted to grip the pintle 28 to retain it. The beveled flange, it will be noted, provides a positive seating surface at the upper side and a lead surface at the under side for guiding the insertion of the pintle. The relatively thin metal thickness enables the spring to be disposed in a comparatively narrow space. The concavo-convex plate is adapted to be used as a reinforcing top pintle bearing for the ball end 29 of the pintle, being first loosely engaged in the socket in contact with the domed upper end thereof, as shown in Fig. 8, and then compressed and expanded at its marginal portion by means of suitable dies 30 and 31 to secure it in the socket end, its diameter in the secured relation being greater than that of the ring opening. In Figs. 10 and 11 th plate is inserted in relation to a flat-topped socket with its concave side upwardly, being then flattened and expanded by means of dies 32 and 33. This bearing will withstand very heavy loads, and enables the use of a socket formed of relatively thin gauge metal.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. The method of manufacturing split spring rings from flat sheet metal, consisting in swaging an annular portion of the metal before blanking from the sheet to render it harder than the unswaged metal, transversely cutting the ring area to produce a split before blanking from the sheet, and blanking the ring in annular relation to said swaged portion.

2. The method of manufacturing split spring rings from flat sheet metal, consisting in forming the ring opening in the sheet, transversely cutting completely across the ring area to produce a split before blanking from the sheet, and blanking the ring in annular relation to said ring area and within the outer extremity of said split.

3. The method of manufacturing split spring rings from flat sheet metal, consisting in imparting a non-flat cross-sectional shape to an annular portion of the ring before blanking from the sheet, transversely cutting the ring area to produce a split before blanking from the sheet, and blanking the ring in annularly spaced relation to said non-flat portion.

4. The method of manufacturing split spring rings from flat sheet metal, consisting in forming the ring opening in the sheet, and imparting a non-flat cross-sectional shape to an annular portion of the ring before blanking from the sheet, transversely cutting the ring area to produce a split before blanking from the sheet, and blanking the ring in annularly spaced relation to said non-flat portion.

5. The method of manufacturing split spring rings from flat sheet metal, consisting in annularly flanging the ring area out of the plane of the sheet before blanking from the sheet, transversely cutting the ring area to produce a split before blanking from the sheet, and blanking the ring in annularly spaced relation to said flange.

6. The method of manufacturing split spring rings from flat sheet metal, consisting in forming the ring opening in the sheet and annularly flanging the ring area about said opening out of the plane of the sheet before blanking from the sheet, transversely cutting the ring area to produce a split before blanking from the sheet, and blanking the ring in annularly spaced relation to said flange.

Signed at Bridgeport, in the county of Fairfield, and State of Connecticut, this 14th day of December, 1926.

WALTER F. HEROLD.